(12) United States Patent
Oppenheimer et al.

(10) Patent No.: US 9,347,509 B2
(45) Date of Patent: May 24, 2016

(54) VIBRATION ISOLATION SYSTEM

(71) Applicant: HEWLETT-PACKARD DEVELOPMENT COMPANY, L.P., Houston, TX (US)

(72) Inventors: Charles H. Oppenheimer, Lake Oswego, OR (US); Russell P. Yearout, Brush Prairie, WA (US); Allen F. Zandonatti, Tigard, OR (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 191 days.

(21) Appl. No.: 13/742,891

(22) Filed: Jan. 16, 2013

(65) Prior Publication Data

US 2014/0197299 A1 Jul. 17, 2014

(51) Int. Cl.
*F16M 1/00* (2006.01)
*F16F 1/36* (2006.01)
*F16F 15/04* (2006.01)

(52) U.S. Cl.
CPC .. *F16F 1/36* (2013.01); *F16F 15/04* (2013.01)

(58) Field of Classification Search
USPC ......... 248/638, 674, 603, 602, 632, 637, 644, 248/645, 672, 675, 678, 310, 314, 315; 310/51, 91, 239, 43
See application file for complete search history.

(56) References Cited

U.S. PATENT DOCUMENTS

| | | | | |
|---|---|---|---|---|
| 3,787,014 A * | 1/1974 | Story et al. | ..................... | 248/558 |
| 4,819,503 A * | 4/1989 | Fazi et al. | ..................... | 248/632 |
| 4,885,496 A * | 12/1989 | Wheeler | ..................... | 310/416 |
| 5,040,764 A * | 8/1991 | Dubois | ..................... | 248/635 |
| 5,126,607 A * | 6/1992 | Merriman, Jr. | ..................... | 310/51 |
| 5,237,231 A * | 8/1993 | Blaettner et al. | ..................... | 310/239 |
| 5,769,382 A | 6/1998 | Kobayashi et al. | | |
| 5,884,893 A | 3/1999 | Seki et al. | | |
| 5,936,646 A * | 8/1999 | Kenny et al. | ..................... | 347/18 |
| 5,959,379 A | 9/1999 | Hu et al. | | |
| 6,045,112 A * | 4/2000 | Kirkwood | ..................... | 248/634 |
| 6,133,666 A * | 10/2000 | Hollenbeck et al. | ..................... | 310/216.079 |
| 6,218,752 B1 * | 4/2001 | Chang et al. | ..................... | 310/91 |
| 6,362,554 B1 * | 3/2002 | Neal | ..................... | 310/216.003 |
| 6,478,838 B2 * | 11/2002 | McSweeney et al. | ..................... | 55/467 |
| 6,498,917 B2 | 12/2002 | Takami | | |
| 6,713,916 B1 * | 3/2004 | Williams et al. | ..................... | 310/89 |
| 6,717,299 B2 * | 4/2004 | Bacile et al. | ..................... | 310/51 |
| 6,858,957 B2 * | 2/2005 | Ortt et al. | ..................... | 310/89 |
| 7,078,835 B2 * | 7/2006 | Gross et al. | ..................... | 310/89 |
| 7,118,018 B2 * | 10/2006 | Turk | ..................... | 227/10 |
| 7,135,796 B2 * | 11/2006 | Ortt et al. | ..................... | 310/89 |
| 7,510,164 B2 * | 3/2009 | Geroux et al. | ..................... | 248/638 |
| 7,568,602 B2 * | 8/2009 | Turk | ..................... | 227/10 |
| 7,876,009 B2 * | 1/2011 | Baranowski et al. | ..................... | 310/89 |
| 7,893,572 B2 * | 2/2011 | Pettitt et al. | ..................... | 310/51 |

(Continued)

FOREIGN PATENT DOCUMENTS

JP 59062178 A 4/1984

*Primary Examiner* — Monica Millner
(74) *Attorney, Agent, or Firm* — HP Inc. Patent Department (57) ABSTRACT

A vibration isolation system, including a housing and a first isolation member which further includes a receptacle to receive an outer body of a motor, a first plurality of compliant arms, and a second plurality of compliant arms. Each compliant arm of the first isolation member has a first end and a second end. The first end of each of the compliant arms is coupled to the receptacle, and the second end of each of the compliant arms is coupled to the housing.

18 Claims, 9 Drawing Sheets

(56) References Cited

U.S. PATENT DOCUMENTS

| | | | |
|---|---|---|---|
| 8,137,082 B2* | 3/2012 | Campbell | 417/423.15 |
| 8,587,173 B2* | 11/2013 | Kurosawa et al. | 310/91 |
| 8,596,596 B2* | 12/2013 | Naji et al. | 248/224.7 |
| 8,619,108 B2* | 12/2013 | Ishidate | 347/242 |
| 2003/0080635 A1* | 5/2003 | Bacile et al. | 310/51 |
| 2004/0135439 A1* | 7/2004 | White | 310/51 |
| 2004/0169118 A1* | 9/2004 | Talaucher et al. | 248/314 |
| 2005/0046733 A1 | 3/2005 | Bang | |
| 2006/0028088 A1* | 2/2006 | McFarland et al. | 310/239 |
| 2006/0175504 A1* | 8/2006 | Talaucher et al. | 248/309.1 |
| 2007/0247009 A1* | 10/2007 | Hoffman et al. | 310/51 |
| 2007/0256887 A1* | 11/2007 | Hirakawa et al. | 180/444 |
| 2009/0058203 A1* | 3/2009 | Pettitt et al. | 310/51 |
| 2009/0058209 A1* | 3/2009 | Baranowski et al. | 310/91 |
| 2012/0119058 A1* | 5/2012 | Ho et al. | 248/638 |
| 2013/0034453 A1* | 2/2013 | Kojima et al. | 417/321 |
| 2013/0162069 A1* | 6/2013 | Fang-Fu | 310/51 |

* cited by examiner

VIBRATION ISOLATION SYSTEM

BACKGROUND

Electric motors are widely used to fulfill a number of duties and/or functions. For example, electric motors are used to drive fans disposed within inkjet printers in order to filter out aerosols which are formed as a result of the printing process. Electric motors, like all other types of motors, produce a certain amount of vibration during their use and vibration isolation systems may be employed to isolate said vibrations.

BRIEF DESCRIPTION OF THE DRAWINGS

For a detailed description of various examples, reference will now be made to the accompanying drawings in which.

NOTATION AND NOMENCLATURE

Certain terms are used throughout the following description and claims to refer to particular system components. As one skilled in the art will appreciate, practitioners may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless connection. Thus, if a first device couples to a second device, that connection may be through a direct mechanical or electrical connection, through an indirect mechanical or electrical connection via other devices and connections, through an optical electrical connection, or through a wireless electrical connection.

DETAILED DESCRIPTION

The following discussion is directed to various examples of the invention. Although one or more of these examples may be preferred, the examples disclosed herein should not be interpreted, or otherwise used, as limiting the scope of the disclosure, including the claims. In addition, one skilled in the art will understand that the following description has broad application, and the discussion of any example is meant only to be descriptive of that example, and not intended to intimate that the scope of the disclosure, including the claims, is limited to that example.

As previously described, electric motors produce a certain amount of vibration during their use. Typically, it is desirable to isolate these vibrations, such that the life of the motor is increased and the acoustic noise produced by the motor is decreased. Additionally, for many consumer products, the chosen vibration isolation system for a given electric motor should also provide some protection from shocks introduced into the system, such as those produced when the motor or product containing the motor is dropped onto a hard surface.

In the following description and figures, examples of a vibration isolation system are described for use with an electric motor disposed in an inkjet printer. However, it should be noted that examples of the vibration isolation system described herein and methods relating thereto may be utilized in a wide variety of systems and applications which employ electric motors, while still complying with the principles disclosed herein. Therefore, inkjet printers are merely one of many potential uses of the vibration isolation system and methods described herein. Thus, any reference to inkjet printers and related subject matter is merely included to provide context to the description contained herein and is in no way meant to limit the scope thereof.

Figure 1:
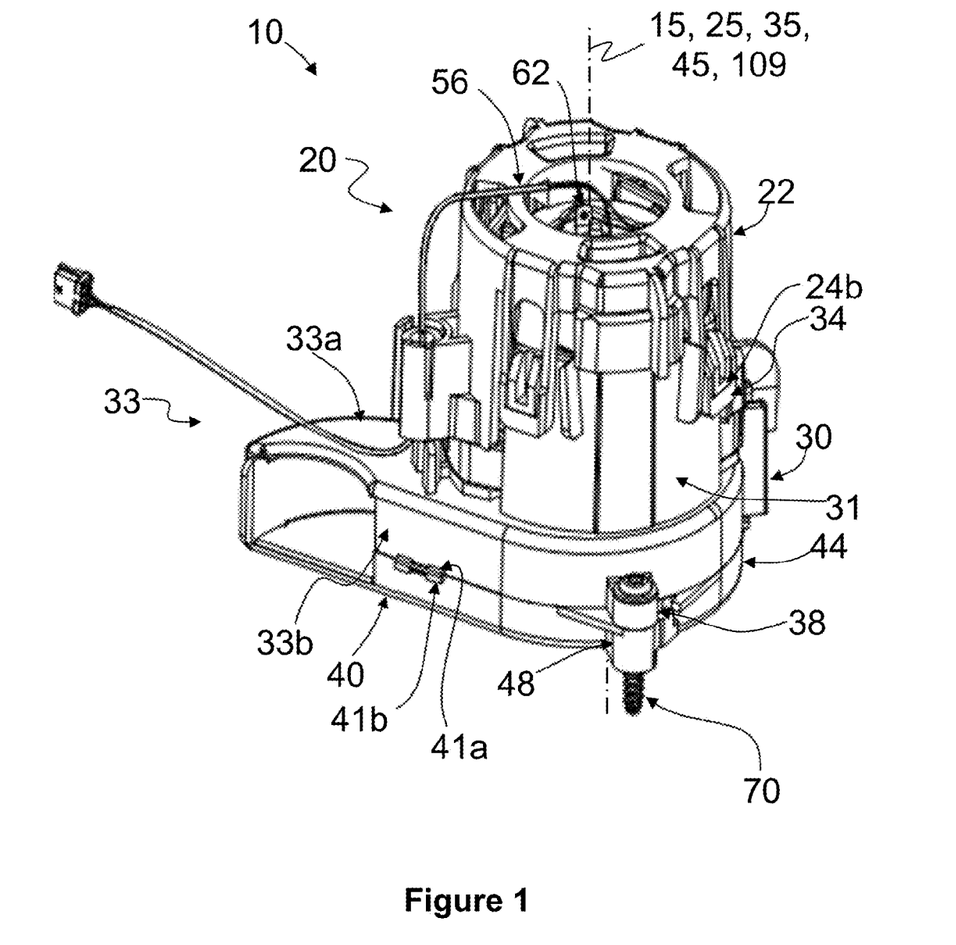
FIG. 1 shows a perspective view of an example of a vibration isolation system in accordance with the principles disclosed herein.
Figure 2:
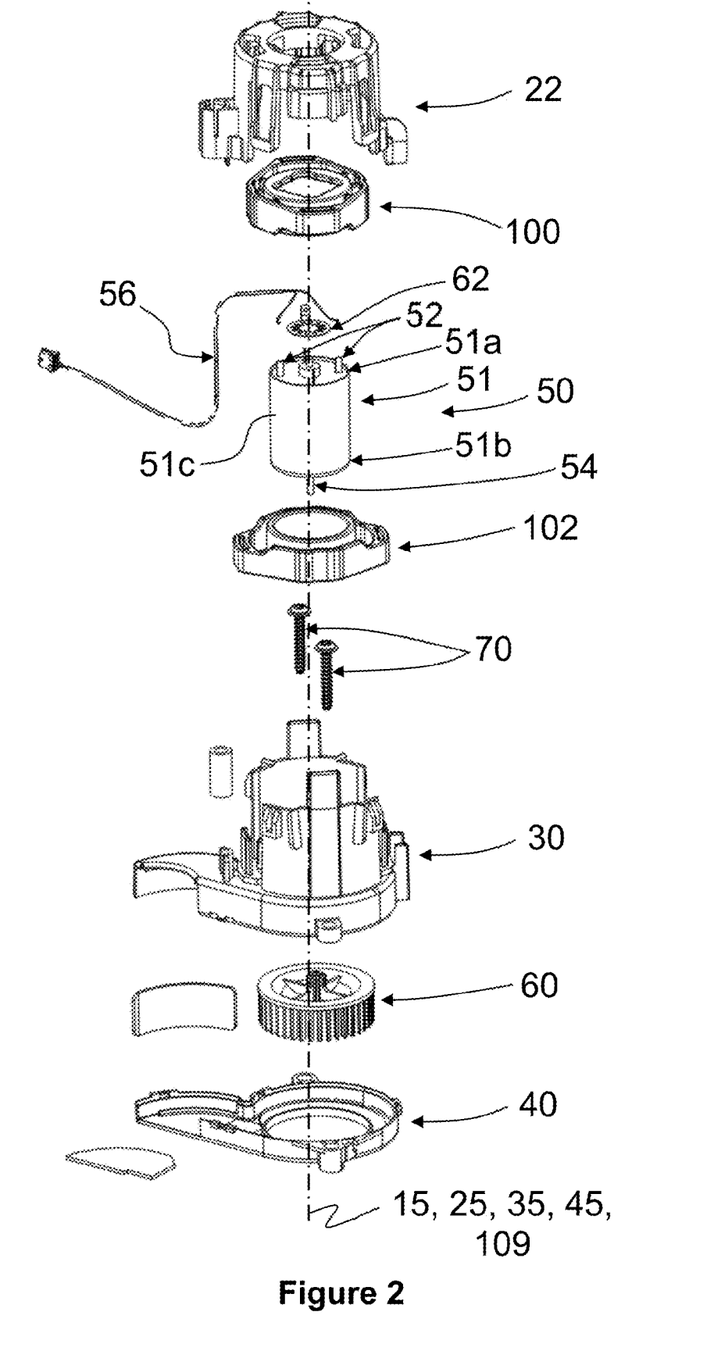
FIG. 2 shows an exploded view of the vibration isolation system of FIG. 1 in accordance with the principles disclosed herein.

Referring to FIGS. 1 and 2, wherein a vibration isolation system 10 in accordance with the principles disclosed herein is shown. System 10 generally includes a central axis 15, an outer housing 20, an electric motor 50, a first or upper vibration isolation member 100, a second or lower vibration isolation member 102, and an impeller 60. The system 10 further includes a pair of securing members 70 for securing the system 10 to a foundation, such as for example, a mounting surface within an inkjet printer. In this example, securing members 70 are screws that include threads to enable members 70 to be coupled to reciprocally threaded apertures within a mounting surface (not shown). However, it should be appreciated that in other examples, any other suitable securing device or means may be used in lieu of members 70 while still complying with the principles disclosed herein. For example, other potential securing devices or means may include bolts, adhesives, nails, rivets, or some combination thereof.

Motor 50 may be any electric motor while still complying with the principles disclosed herein. Generally, motor 50 comprises a substantially cylindrically shaped body 51 which further includes a first or upper end 51a, a second or lower end 51b, and a cylindrical outer surface 51c extending between the ends 51a, b. Electrodes 52 extend axially from the upper end 51a and are arranged to electrically couple the motor 50 to a power source (not shown) via conductors 56. A ground plate 62 is disposed on the upper end 51a of the motor body 51 and is electrically coupled to the electrodes 52 in order to provide a grounding contact for the motor 50. In particular, the grounding plate 62 provides a conductive path from the motor 50 to ground such that any build-up of electric charge may be dissipated. A shaft 54 extends axially from the lower end 51b and is arranged such that it rotates about the axis 15 during operation. In this example, an impeller 60 is included which is arranged to couple to the shaft 54. Impeller 60 is arranged to draw air toward a filter mechanism (not shown) when the shaft 54 is rotated by the motor 50 in order to filter out aerosols which are produced within an inkjet printer during a printing process. However, it should be appreciated that in other examples, no impeller 60 may be included while still complying with the principles disclosed herein.

Figure 3:
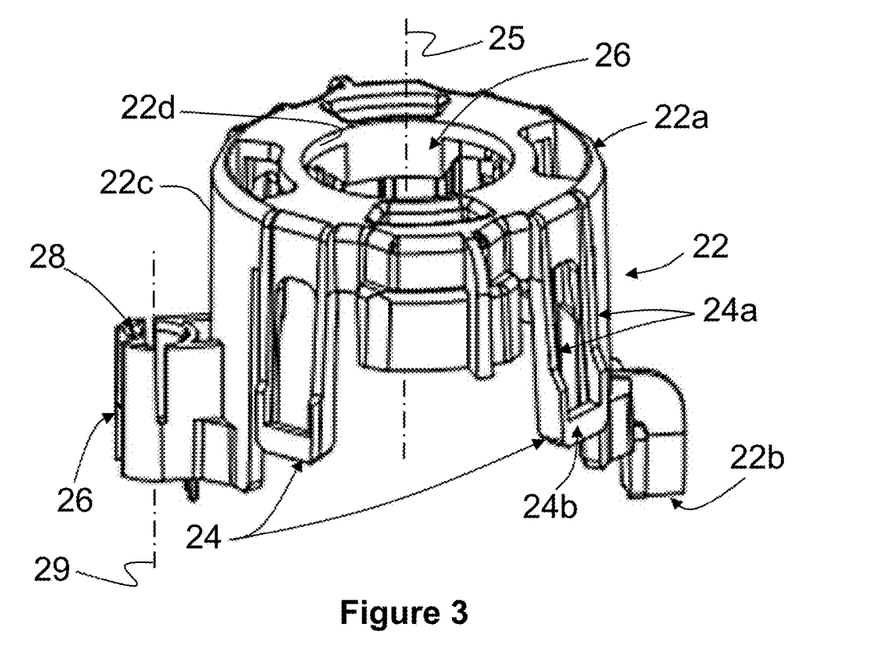
FIG. 3 shows a perspective view of the upper housing member of the system of FIG. 1 in accordance with the principles disclosed herein.

Referring now to FIG. 3, upper housing member 22 is substantially cylindrical in shape and includes a central axis 25 that is aligned with the axis 15 during operation, a first or upper end 22a, a second or lower end 22b opposite the upper end 22a, an outer surface 22c extending axially between the ends 22a, b, an inner surface 22d extending axially between the ends 22a, b, and an inner hollow region 28 substantially aligned with axis 25 and defined by the inner surface 22d. Upper housing member 22 also includes a plurality of axial protrusions 24, each further including a pair of arms 24a extending axially along the outer surface 22c from the upper end 22a, and a mating surface 24b extending between, and substantially perpendicular to the arms 24a.

A ferrite housing 26 is disposed on the outer surface 22c proximate the lower end 22b. Ferrite housing 26 includes a central axis 29 that is radially offset from and parallel to the axis 25 and a substantially cylindrical receptacle 28 coaxially aligned with the axis 29. As will be explained in more detail below, receptacle 28 houses a ferrite (not shown). In some examples, the ferrite comprises iron and reduces electromagnetic radiation from the conductors 56, thereby minimizing the risk of "cross-talk" or electrical interference with other components which may be placed in close proximity to the motor 50.

Figure 4:
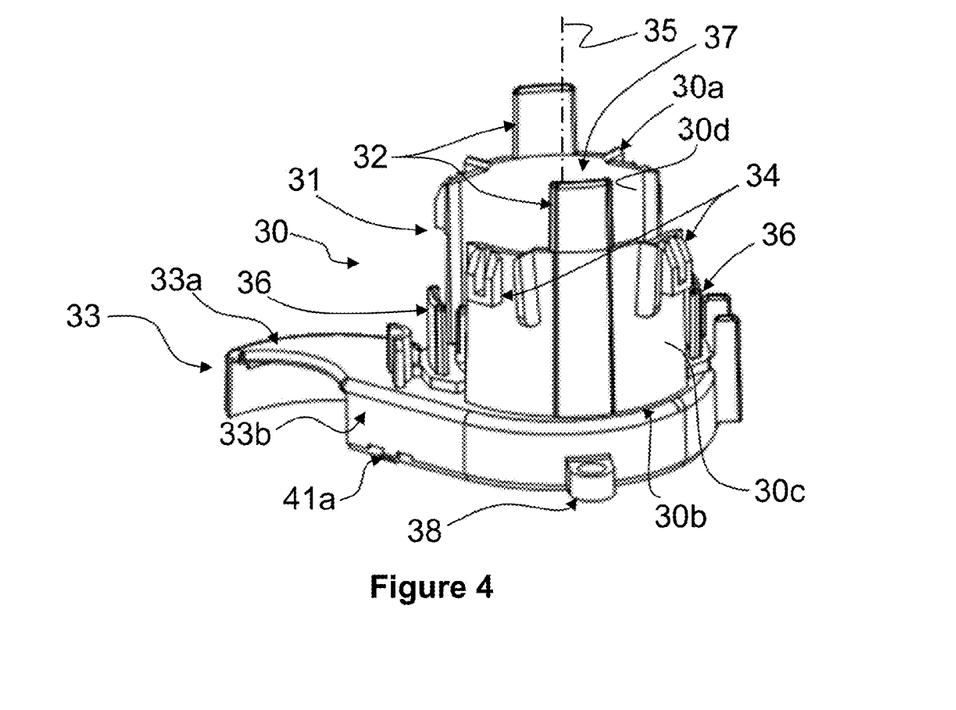
FIG. 4 shows a perspective view of the lower housing member of the system shown in FIG. 1 in accordance with the principles disclosed herein.

Referring now to FIG. 4, lower housing member 30 generally comprises a central axis 35 that is aligned with axis 15 during operation, a first or upper portion 31, and a second or lower portion 33. Upper portion 31 is substantially cylindrical is shape and includes a first or upper end 30a, a second or lower end 30b opposite the upper end 30a, an outer surface 30c extending axially between the ends 30a, b, an inner surface extending axially between the ends 30a, b, and an inner hollow region 37 substantially aligned with the axis 35 and defined by the inner surface 30d. A first pair of tabs 32 extend axially from the upper end 30a and are generally arranged radially opposite one another about axis 35. A second pair of tabs 36 extend axially from the lower end 30b towards the upper end 30a and are generally arranged radially opposite one another about the axis 35. In this example, the first pair of tabs 32 is axially offset and angularly shifted 90° from the second pair of tabs 36. A plurality of projections 34 extend radially outward from the outer surface 30c and, as is explained in more detail below, are arranged to engage with the mating surfaces 24b on the axial protrusions 24 of the upper housing member 22.

The second or lower portion 33 of the lower housing 30 is coupled to the lower end 30a of the upper portion 31. In this example, lower portion 33 comprises a radially oriented substantially planar surface 33a and an axially oriented substantially planar surface 33b. An aperture (not shown) is disposed on the surface 33a that is coaxially aligned with the axis 35 and the inner hollow region 37, to allow the shaft 54 of the motor 50 to extend therethrough during operation. A plurality of first or upper securing receptacles 38 extend radially outward from surface 33b to receive the securing members 70. Further, the surface 33b also comprises a plurality of first or upper attachment members 41a (only one such attachment member 41a is shown in FIG. 4) disposed thereon. As will be discussed in more detail below, members 41a allow the lower housing member 30 to be coupled to the base 40.

Figure 5:
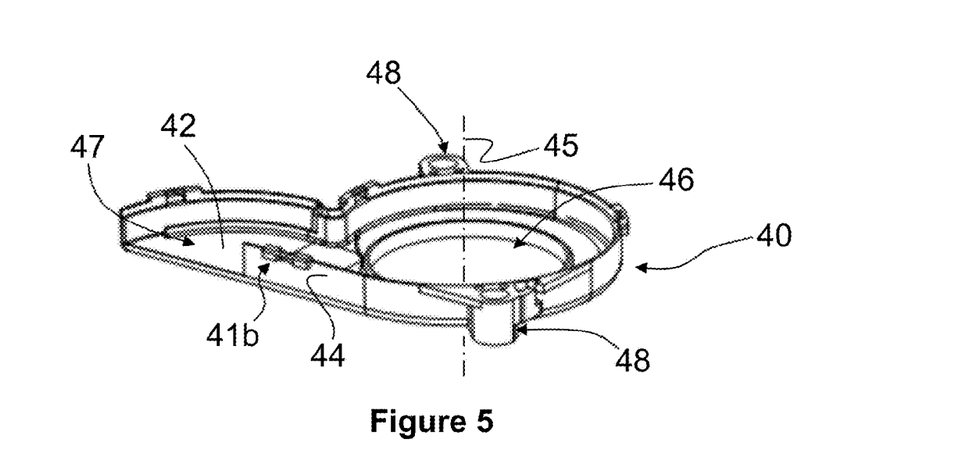
FIG. 5 shows a perspective view of the base of the system shown in FIG. 1 in accordance with the principles disclosed herein.

Referring now to FIG. 5, base 40 generally comprises an axis 45 that is aligned with the axis 15 during operation, a radially oriented substantially planar surface 42, and an axially oriented substantially planar surface 44 to correspond and engage with the surface 33b of the lower portion 33 of the lower housing member 30. The surface 42 includes an aperture 46 that is coaxially aligned with the axis 45. Further, the surface 44 includes a plurality of second or lower securing receptacles 48 and a plurality of lower attachment members 41b each extending radially therefrom. As will be described in more detail below, the lower securing members 48 correspond to and engage with the upper securing members 38 and the lower attachment members 41b correspond to and engage with the upper attachment members 41a when the lower housing member 30 is coupled to the base 40.

Figure 6:
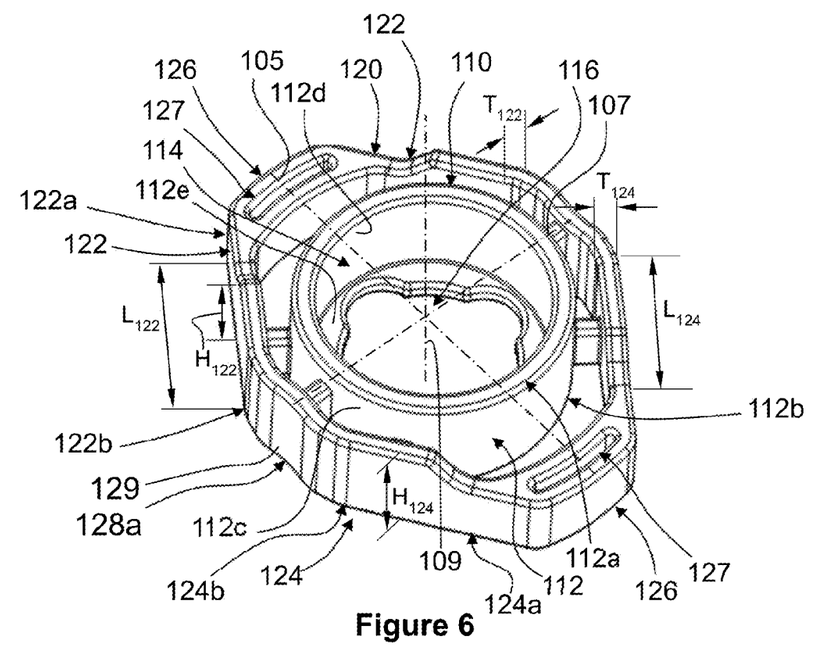
FIG. 6 shows a perspective view of an example of a vibration isolation member in accordance with the principles disclosed herein.
Figure 7:
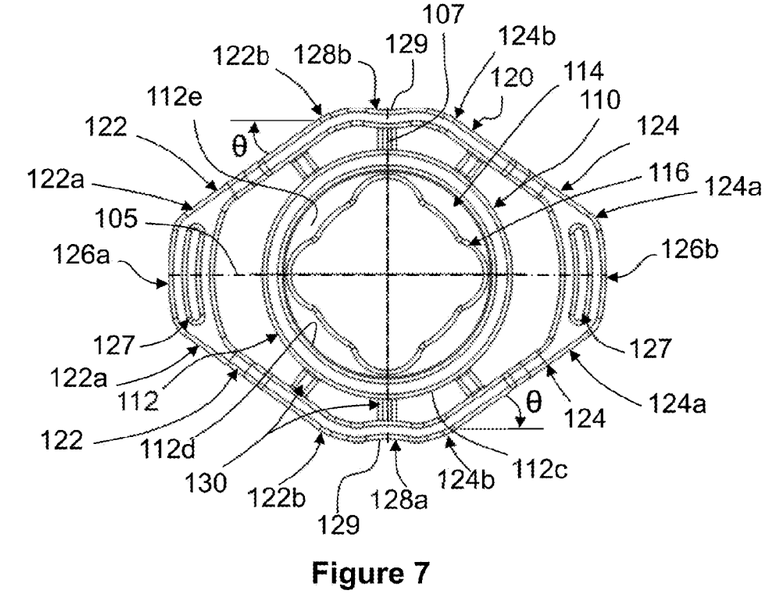
FIG. 7 shows a top view of the motor isolation member of FIG. 6 in accordance with the principles disclosed herein.

Referring now to FIGS. 6 and 7, wherein an example of the vibration isolation member 100 is shown in accordance with the principles disclosed herein. It should be appreciated that, in some implementations, the member 102 is substantially identical to the member 100. Therefore, a description of the vibration isolation member 100 also applies to fully describe the member 102. Thus, for purposes of conciseness, a separate description of the member 102 has been omitted. As is shown in FIGS. 6 and 7, member 100 generally includes a central longitudinal axis 109 that is aligned with axis 15 during operation, a major axis 105, and a minor axis 107. The major and minor axis 105 and 107 respectively, are angularly rotated 90° from one another such that they define a plane that is perpendicular to the axis 109. Additionally, as can be seen in FIG. 6, the axes 105, 107, and 109 all intersect at the same point. Referring back to FIGS. 6 and 7, member 100 further includes an inner structure 110 and an outer structure 120, where the structures 110 and 120 are coaxially disposed about the axis 109 and are coupled to one another via a plurality of bridge members 130.

The inner structure 110 comprises a substantially cylindrical body 112 that further includes a first or upper open end 112a, a second or lower end 112b, a substantially cylindrical outer surface 112c extending between the ends 112a, b, a substantially cylindrical inner surface 112d extending between the ends 112a, b, and a substantially planar surface 112e disposed at the lower end 112b. Body 112 also includes an inner receptacle 114 that is defined by the surfaces 112d, e, and is substantially symmetrically disposed about the axis 109. An aperture 116 is disposed on the surface 112e such that it is also substantially symmetrically disposed about the axis 109.

As is best shown in FIG. 7, the outer structure 120 generally comprises a first lateral side 126a, a second lateral side 126b opposite the first lateral side 126a, a front side 128a, and a rear side 128b opposite the front side 128a. The lateral sides 126a, b are disposed at the intersection points of the major axis 105 and the outer structure 120 from a top view (such as is shown in FIG. 7), while the front and rear sides 128a, b, respectively, are disposed at the intersection points of the minor axis 107 and the outer structure 120 from a top view. A mounting receptacle 127 is disposed at each of the lateral sides 126a, b such that the member 100 may be coupled to the housing 20, as is described in more detail below. Further, in this example, the front side 126a and the rear side 126b each include an inward facing depression or dip 129. In some examples, the dip 129 allows the outer structure 120 and cylindrical body 112 to deform along both the major axis 105 and the minor axis 107 with minimal radial deformation with respect to axis 109 in order to comply with spacing requirements when the outer body 51 of motor 50 is placed within the receptacle 114 of body 112, as will be described in more detail below.

Outer structure 120 further includes a first plurality of compliant arms 122 and a second plurality of compliant arms 124, wherein the second plurality of compliant arms 124 is disposed symmetrically opposite the first plurality of compliant arms 122 about the axis 107. Further, each of the first plurality of compliant arms 122 has a first end 122a and a second end 122b opposite the first end 122a; while each of the second plurality of compliant arms 124 has a first end 124a and a second end 124b opposite the first end 124a. In this embodiment, there are a total of four compliant arms—two compliant arms 122 and two compliant arms 124. However, it should be appreciated that in other examples, more or less compliant arms 122, 124 may be included while still complying with the principles disclosed herein. In the example shown, one of the arms 122 extends from the first lateral side 126a to the rear side 128b; while the other arm 122 extends from the first lateral side 126a to the front side 128a. Similarly, one of the arms 124 extends from the second lateral side 126b to the rear side 128b, while the other arm 124 extends from the second lateral side 126b to the front side 128a. Thus, the first and second pluralities of compliant arms 122, 124, respectively, are generally oriented at an angle θ, with respect to the axis 105. In some examples, θ may range from 0 to 90°. However, it should be noted that the value of θ may be chosen in order to allow the member 100 to fit within a limited amount of available space. It should also be appreciated that in some examples each of the first and second pluralities of compliant arms 122, 124, respectively are oriented in a non-radial direction with respect to the axis 109. This non-radial orientation of the arms 122, 124 imparts multi-directional vibration isolation properties to the member 100, thus allowing member 100 to isolate vibrations that are directed both axially and radially with respect to axis 109.

Referring now to FIG. 6, each of the first plurality of compliant arms has a length $L_{122}$ measured from between the ends 122a, b, a thickness $T_{122}$, and a height $H_{122}$. Similarly, each of the second plurality of compliant arms 124 has a length $L_{124}$ measured between the ends 124a, b, a thickness $T_{124}$, and a height $H_{124}$. As will be described in more detail below, the lengths $L_{122}$, $L_{124}$, the thicknesses $T_{122}$, $T_{124}$, and the heights $H_{122}$, $H_{124}$ of the complaint arms 122, 124 respectively, are chosen to tailor the vibration isolation properties of the member 100 for a given application. For example, if a greater level of stiffness is required along the axis 109 than along the axes 105, 107, for the member 100, then the $L_{122}$, $L_{124}$, $H_{122}$, $H_{124}$, $T_{122}$, and $T_{124}$ may be adjusted in order to achieve the desired stiffness property.

Member 100 may comprise any suitable compliant material for isolating vibration, while still complying with the principles disclosed herein. In some implementations, materials which make up member 100 may also have a relatively high tolerance against permanent creep deformation. An example of such a suitable material includes ELASTOSIL®, available from Wacker Chemical Corporation, located in Munich, Germany. Further in this implementation, member 100 is constructed out of silicone. In still other examples, the compliant arms 122, 124 may comprise steel wire, while the cylindrical body 112 may comprise molded hard plastic or stamped steel. Further, in this example, the inner structure 110, the outer structure 120, and the bridge members 130 of each member 100 are all monolithically formed. However, in other examples, the inner structure 110, the outer structure 120, and the bridge members 130 may not be monolithically formed while still complying with the principles disclosed herein.

Referring now to FIGS. 8-11, in order to make up the vibration isolation system 10, motor 50 is placed within the receptacles 114 of the vibration isolation members 100, 102, previously described. Next, the motor 50 and attached members 100, 102 are placed within the lower housing member 30, and the upper housing member 22 is coupled to the upper end 30a of the lower housing member 30. Each of these installation steps will not be described in more detail below.

Figure 8:
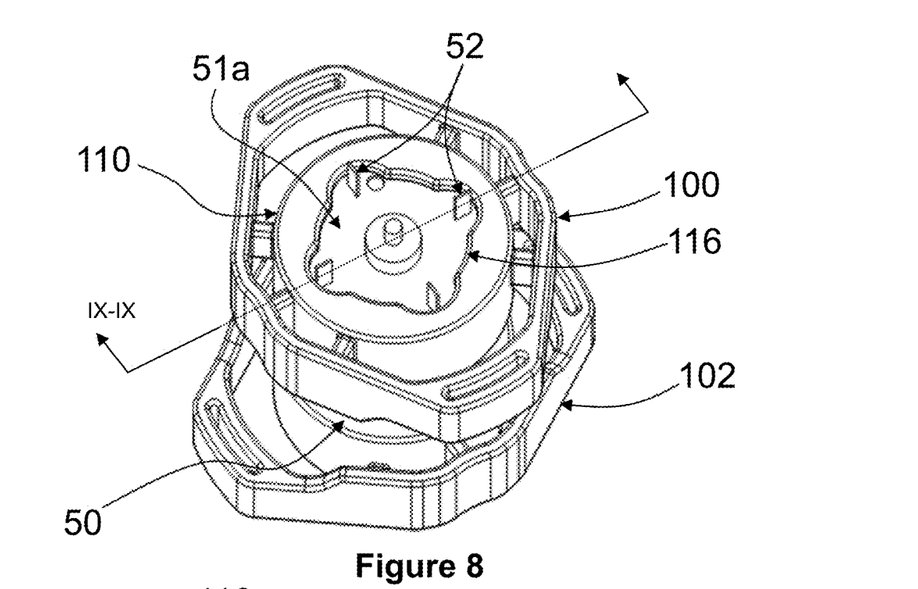
FIG. 8 shows a perspective view of a pair of the vibration isolation members of FIG. 6 coupled to an electric motor in accordance with the principles disclosed herein.
Figure 9:
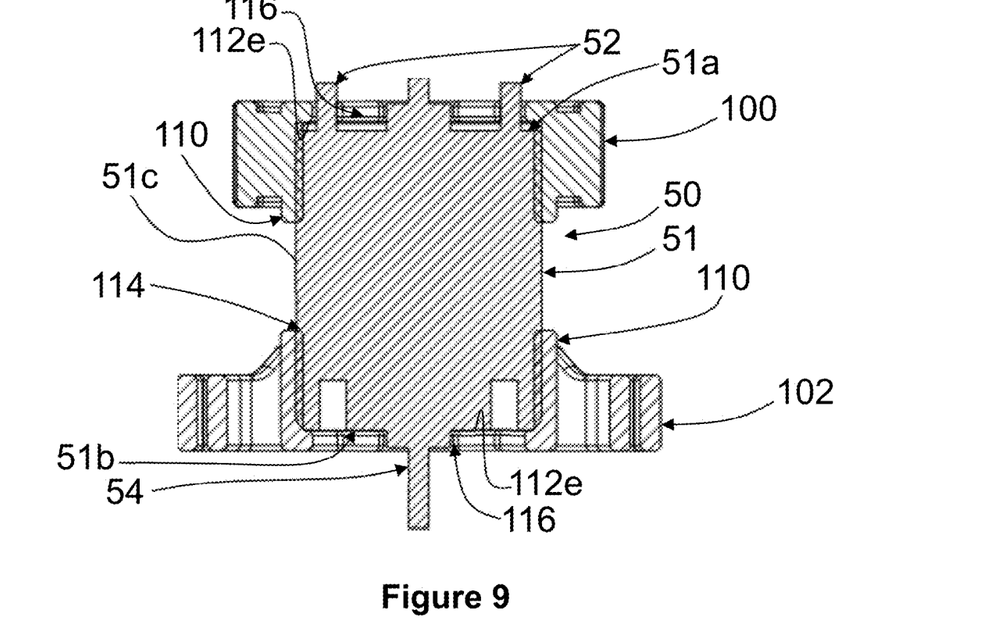
FIG. 9 shows a cross-sectional view of the motor and vibration isolation members of FIG. 5 along the cross-section IX-IX in accordance with the principles disclosed herein.

Referring specifically to FIGS. 8 and 9, initially the members 100, 102 are coupled to the motor 50 such that the body 51 is received within the receptacles 114. As is best shown in FIG. 9, the upper vibration isolation member 100 is disposed about the motor 50 such that the upper end 51a of the body 51 abuts the surface 112e and the electrodes 52 extend through the aperture 116. Similarly, the lower vibration isolation member 102 is disposed about the motor 50 such that the lower end 51b of the body 51 abuts the surface 112e and the shaft 54 extends through the aperture 116. In this example, the motor 50 is secured within the receptacles 114 of the members 100, 102 via an interference fit.

Figure 10:
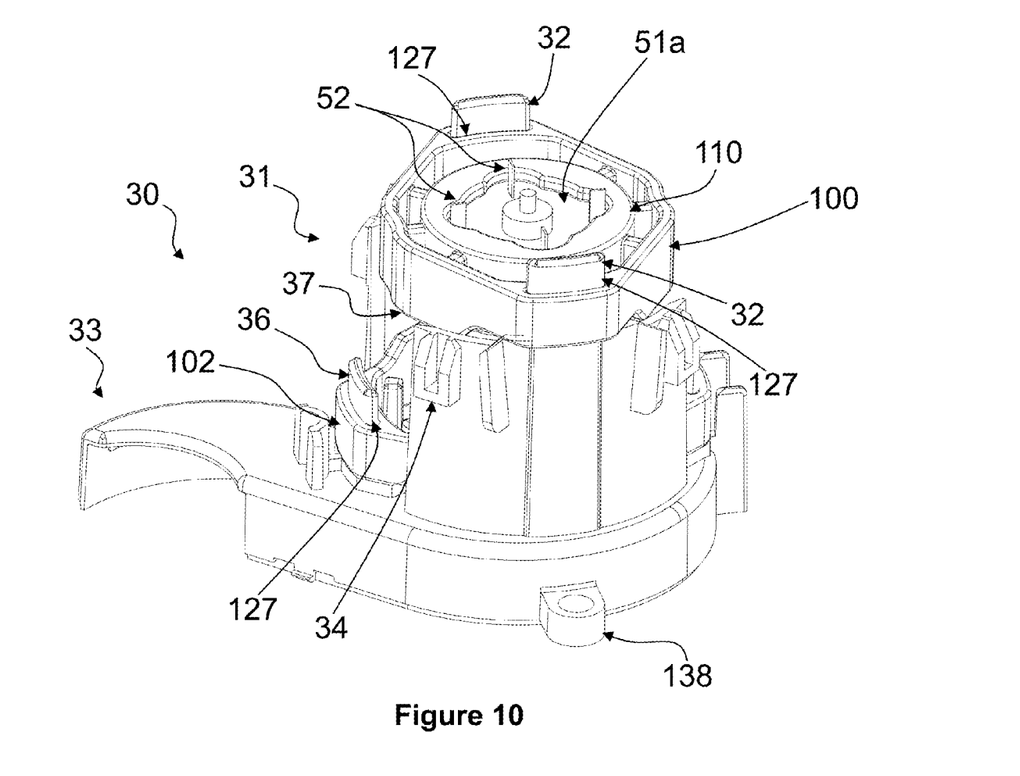
FIG. 10 shows a perspective view of the motor, upper vibration isolation member, and bottom isolation member coupled to the lower housing of the system of FIG. 1 in accordance with the principles disclosed herein.

Referring now to FIG. 10, once the body 51 of motor 50 is secured within the receptacles 114 of the members 100, 102, the motor 50 and members 100, 102 are installed within the lower housing member 30. Specifically, the second pair of tabs 36 are each inserted within the corresponding mounting receptacles 127 on the lower vibration isolation member 102, and the first pair of tabs 32 are each inserted within the corresponding mounting receptacles 127 on the upper vibration isolation member 100. Thus, the motor 50 is suspended within the inner hollow region 37 of the upper portion 31 of the lower housing member 30 via the members 100, 102.

Figure 11:
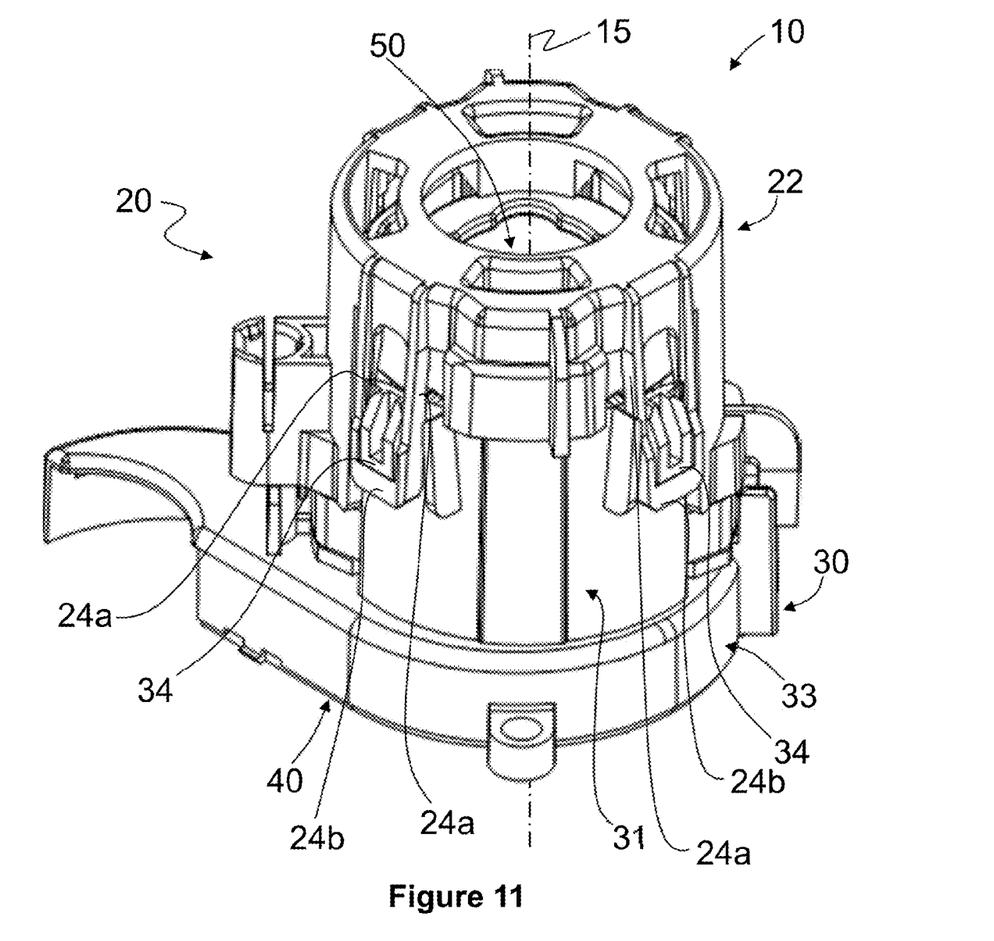
FIG. 11 shows a perspective view of the motor, upper vibration isolation member, and bottom isolation member of FIG. 10 with the upper housing member also coupled thereto in accordance with the principles disclosed herein.

Referring now to FIG. 11, the upper housing member 22 is then installed on the upper portion 31 of the lower housing member 30. Specifically, the mating surfaces 24b on the axial protrusions 24 engage with and snap onto the radial projections 34 disposed on the outer surface 30c of the upper portion 31 of the lower housing member 30, such that the upper housing member 22 is secured to the lower housing member 30.

Referring back to FIG. 1, the impeller 60 (not shown in FIG. 1) is coupled to the shaft 54 and the base 40 is installed onto the lower portion 33 of the lower housing member 30. Specifically, the base 40 is coupled to the lower portion 33 of the lower housing member 30 such that surface 44 engages with surface 33b, the lower attachment members 41b engage with the upper attachment members 41a, and the lower securing receptacles 48 engage and align with the upper securing receptacles 38. The securing members 70 are then inserted through the aligned upper and lower securing receptacles 38, 48, respectively. Thereafter, the members 70 may additionally be secured to a support surface (not shown), thus securing the system 10 to said support surface.

Still referring to FIG. 1, during operation, system 10 is coupled to a support structure or foundation (not shown) and the motor 50 is energized, via the conductors 56, such that the shaft 54 rotates about the axis 15. Specifically, when motor 50 is energized, internal electromagnetic forces are produced that drive the shaft 54 to rotate. These internal forces have dynamic components that excite vibration in the motor 50. The body 51 of motor 50 interacts with the receptacles 114 on the members 100, 102 such that the vibrations produced within the motor 50 pass through said receptacles 114 and into the first and second pluralities of compliant arms 122, 124, respectively. Thereafter, the arms 122, 124 bend and/or flex in response to the vibrations emitted from the body 51 of the motor 50. Therefore, the flexibility of the compliant arms 122, 124 minimizes interaction with surrounding structures (e.g., outer housing 20) and thus also minimizes vibrations transmitted between the motor 50 and said structures.

The amount or degree of isolation provided by members 100, 102 typically increases with the compliance or flexibility of said members 100, 102. As previously described, the dimensions of the arms 122, 124 (e.g., $T_{122}$, $L_{122}$, $H_{122}$, $T_{124}$, $L_{124}$, $H_{124}$) determine the resulting flexibility of the arms 122, 124. Thus, the resulting degree of vibration isolation provided by the members 100, 102 may be tailored by adjusting said dimensions. Further, the direction of the compliance or flexibility of the members 100, 102 may also be tailored for each specific application. In the examples described above, the members 100, 102 are designed to provide nearly omnidirectional compliance (i.e., the compliance is substantially the same for both the radial and axial directions with respect to axis 15 in FIG. 1). However, it should be appreciated that in other implementations, the vibration isolation members 100, 102 may have differing degrees of flexibility or compliance in the axial and/or radial directions. In particular, the dimensions of length and cross-sectional thickness along the direction of bending tend to play a critical role in determining the resulting flexibility or compliance of the arms 122, 124 along either the radial or axial directions, due to the fact that beam flexibility tends to increase with the cube of the ratio of length to this thickness. Thus, some implementations of members 100, 102 may have a higher degree of axial compliance, while maintaining a relatively lower degree of radial compliance by tailoring the dimensions of length $L_{122}$, $L_{124}$, and the height $H_{122}$, $H_{124}$, for each of the complaint arms 122, 124, respectively. Alternatively, other implementations of members 100, 102 may have a higher degree of radial compliance, while maintaining a relatively lower degree of axial compliance, by tailoring the dimensions of length $L_{122}$, $L_{124}$, and the thickness $T_{122}$, $T_{124}$, for each of the compliant arms 122, 124, respectively.

Furthermore, because the members 100, 102 are constructed out of a compliant material, they provide protection against sudden shock events. Specifically, during a sudden shock event, such as is developed by dropping the system 10 against a hard surface (e.g., the ground), transient motion of the motor 50 is limited by the inner walls (e.g., surfaces 22d, 30d) of the outer housing 20. Additionally, any contact between the motor 50 and the inner surfaces (e.g., surfaces 22d, 30d) of the outer housing 20 is effectively cushioned by the members 100, 102. Thus, the vibration isolation members 100, 102 not only isolate vibrations emitted by the motor 50, but also snub shocks which may be introduced to the system 10.

Figure 12:
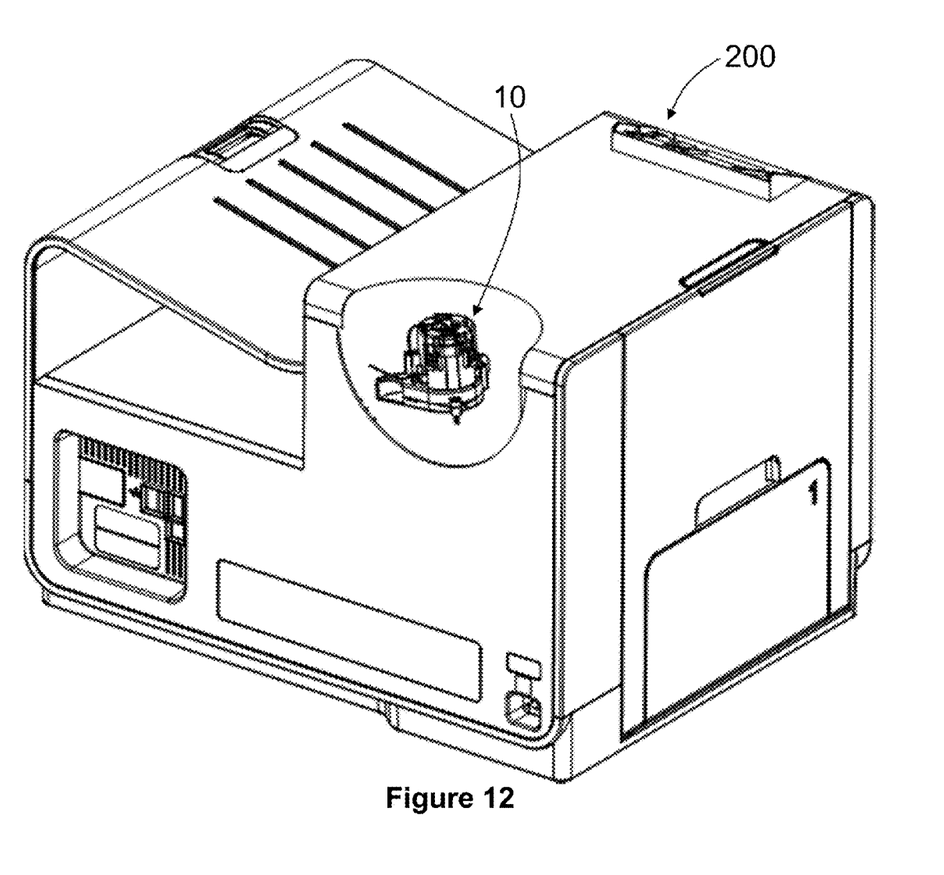
FIG. 12 shows a partially schematic perspective view of the vibration isolation system of FIG. 1 disposed within a printer in accordance with the principles disclosed herein.

Referring now to FIG. 12, in some examples, the system 10 may be disposed within a printer 200. Specifically, in some examples, the system 10 may be used within an inkjet printer in order to control the production of aerosols emitted during the printing process. However, as is previously described above, the system 10 may be utilized in a wide variety of applications in order to reduce vibrations and/or noise produced by electric motor (e.g., motor 50) operation. Additionally, while examples disclosed herein have included a housing (e.g., housing 20) which completely surrounds the motor (e.g., motor 50), in other examples, the housing may not completely surround the motor. Also, while examples described and shown herein have included two vibration isolation members (e.g., members 100, 102), other examples may only include one vibration isolation member, and still other examples may include more than two vibration isolation members while still complying with the principles disclosed herein. Further, in some examples, no bridge members 130 are included on the vibration isolation members 100, 102 and the compliant arms 122, 124 are coupled directly to the inner structure 110 at the second ends 122b, 124b. Still further, while examples shown and disclosed herein have included a motor 50 coupled to an impeller 60, in other examples, no impeller 60 is included and the motor 50 may be coupled to a wide variety of components including, for example, a gear, a pulley, or a roller. In some examples, the lower portion 33 of the lower housing member 30 and the base 40 are not included while still complying with the principles disclosed herein.

The above discussion is meant to be illustrative of the principles and various examples of the present invention. Numerous variations and modifications will become apparent to those skilled in the art once the above disclosure is fully appreciated. It is intended that the following claims be interpreted to embrace all such variations and modifications.

What is claimed is:

1. A vibration isolation system, comprising:
    a first isolation member having a minor axis and a major axis orthogonal to the minor axis, with lateral extensions along the major axis, the first isolation member comprising a first plurality of compliant arms, and a second plurality of compliant arms, wherein a major portion of each arm of the plurality of compliant arms is straight, and an arm of the first plurality of compliant arms and an arm of the second plurality of compliant arms are arranged at a same angle with respect to the major axis;
    a first receptacle to receive an outer body of a motor;
    a plurality of bridge members connected between the first receptacle and the arms of the first isolation member to support the first receptacle inside the first isolation member;
    a second isolation member having a minor axis and a major axis orthogonal to the minor axis, with lateral extensions along the major axis, the major axis of the first isolation member arranged orthogonally to the major axis of the second isolation member, the second isolation member comprising a third plurality of compliant arms and a fourth plurality of compliant arms;
    a second receptacle to receive the outer body of the motor; and
    a plurality of bridge members connected between the second receptacle and the arms of the second isolation member to support the second receptacle inside the second isolation member.

2. The vibration isolation system of claim 1, wherein the lateral extensions each comprise a receiver for receiving a support on which the vibration isolation system is mounted.

3. The vibration isolation system of claim 1, wherein the first isolation member comprises a creep resistant material.

4. The vibration isolation system of claim 1, wherein the motor is suspended within a housing via the first isolation member.

5. The vibration isolation system of claim 1, wherein the outer body of the motor has a central axis, and the second isolation member is axially offset from the first isolation member.

6. The vibration isolation system of claim 5, wherein the first isolation member is circumferentially offset from the second isolation member relative to the central axis.

7. The vibration isolation system of claim 1, wherein the lateral extensions each comprise a receiver for receiving a support on which the vibration isolation system is mounted, supports for the first isolation member being longer than supports for the second isolation member.

8. The vibration isolation system of claim 1, wherein the motor is suspended within a housing via first isolation member and the second isolation member.

9. The vibration isolation system of claim 8, wherein the housing further comprises: a first housing member; and a second housing member.

10. The vibration isolation system of claim 9, wherein both the first and second isolation members are coupled to the second housing member.

11. The vibration isolation system of claim 9, wherein the first housing member is arranged to releasably couple to the second housing member.

12. The vibration isolation system of claim 1, wherein the first isolation member further comprises an aperture to allow one of a motor shaft and an electrode to pass therethrough.

13. A vibration isolation member, comprising:
an upper member and a lower member each comprising:
a receptacle to receive an outer body of a motor;
a first plurality of compliant arms;
a second plurality of compliant arms;
wherein the receptacle is supported by the compliant arms; and
two lateral extensions on opposites sides, each lateral extension comprising a receiver for receiving, a support on which the vibration isolation member is mounted;
wherein the lateral extensions of the upper member are arranged substantially at right angles to the lateral extensions of the lower member, and the lateral extensions of the upper member extend beyond an outer edge of the lower member, and the lateral extensions of the lower member extend beyond an outer edge of the upper member;
wherein supports for the receivers of the upper member are longer than supports for the receivers of the lower member.

14. The vibration isolation member of claim 13, wherein each of the compliant arms has a first end and a second end, an end of each of the compliant arms being coupled to one of the lateral extensions.

15. The vibration isolation member of claim 13, further comprising a plurality of bridge members coupling the receptacle to the first end of each of the compliant arms.

16. The vibration isolation member of claim 13, wherein the compliant arms and the receptacle are made of silicone.

17. The vibration isolation member of claim 13, wherein the compliant arms comprise steel wire.

18. A vibration isolation system, comprising:
a first isolation member having a minor axis and a major axis orthogonal to the minor axis, with lateral extensions along the major axis, the first isolation member comprising a first plurality of compliant arms and a second plurality of compliant arms, wherein an arm of the first plurality of compliant arms and an arm of the second plurality of compliant arms are arranged at a same angle with respect to the major axis;
a second isolation member having a minor axis and a major axis orthogonal to the minor axis, with lateral extensions along the major axis, the second isolation member comprising a third plurality of compliant arms and a fourth plurality of compliant arms;
a first receptacle to receive an outer body of a motor and a second receptacle to receive an outer body of a motor;
a first plurality of bridge members connected between the first receptacle and the arms of the first isolation member to support the first receptacle inside the first isolation member; and
a second plurality of bridge members connected between the second receptacle and the arms of the second isolation member to support the second receptacle inside the second isolation member;
wherein a separation between the first isolation member and the receptacle is greater along the major axis than along the minor axis and the major axis of the first isolation member is arranged orthogonally to a major axis of a second isolation member.

* * * * *